May 18, 1926.
L. R. HUFF
VOLUME REGULATOR GAUGE
Filed June 26, 1923  2 Sheets-Sheet 1
1,584,859
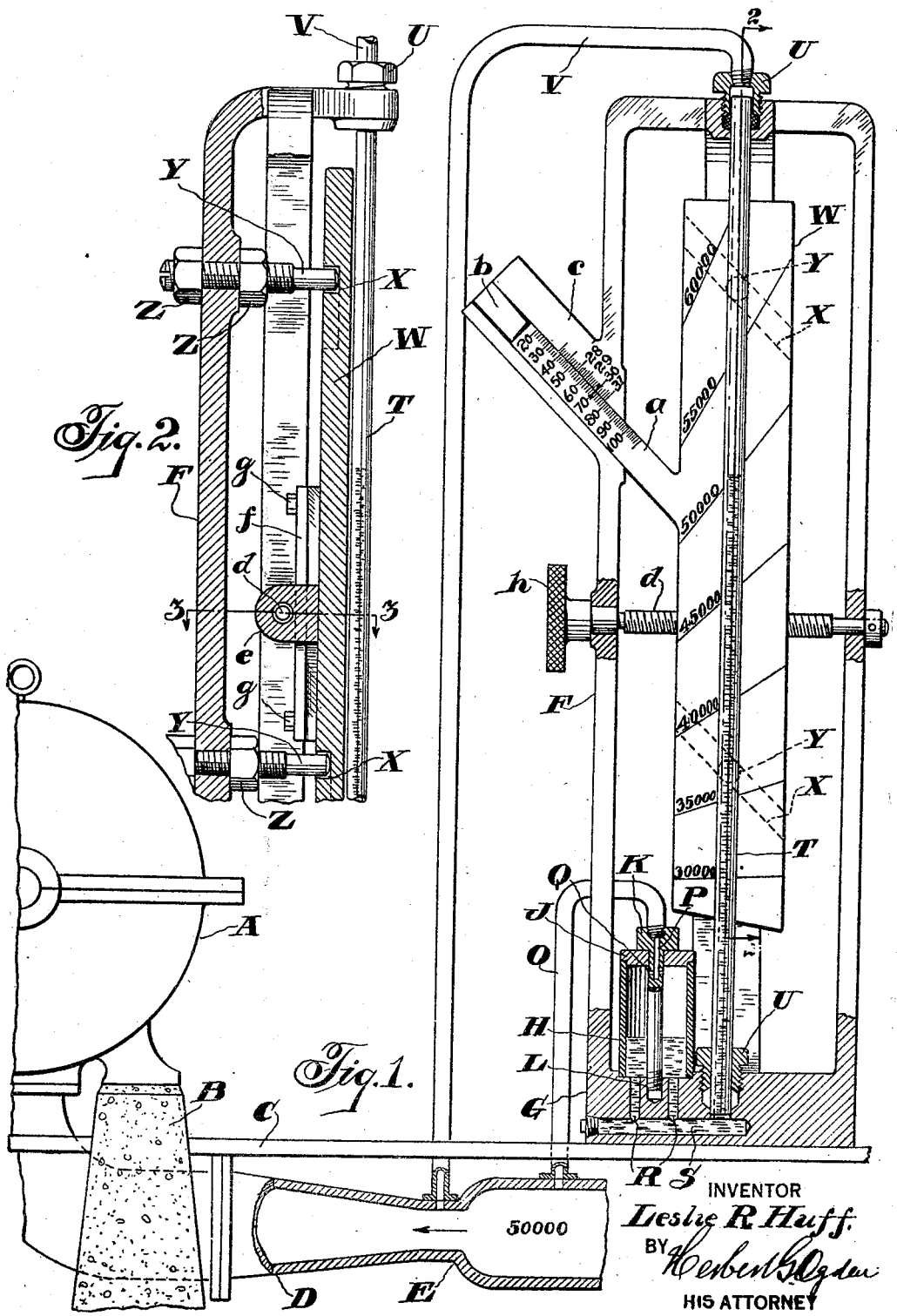
INVENTOR
Leslie R. Huff.
BY Herbert S. Ogden
HIS ATTORNEY May 18, 1926.
L. R. HUFF
1,584,859
VOLUME REGULATOR GAUGE
Filed June 26, 1923  2 Sheets-Sheet 2
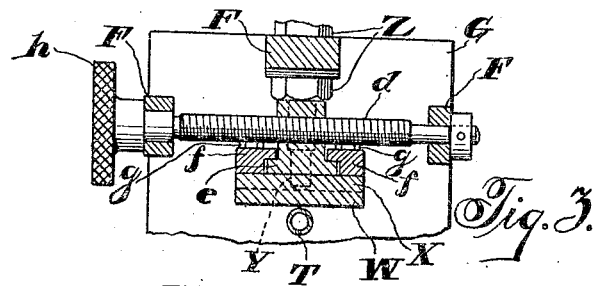
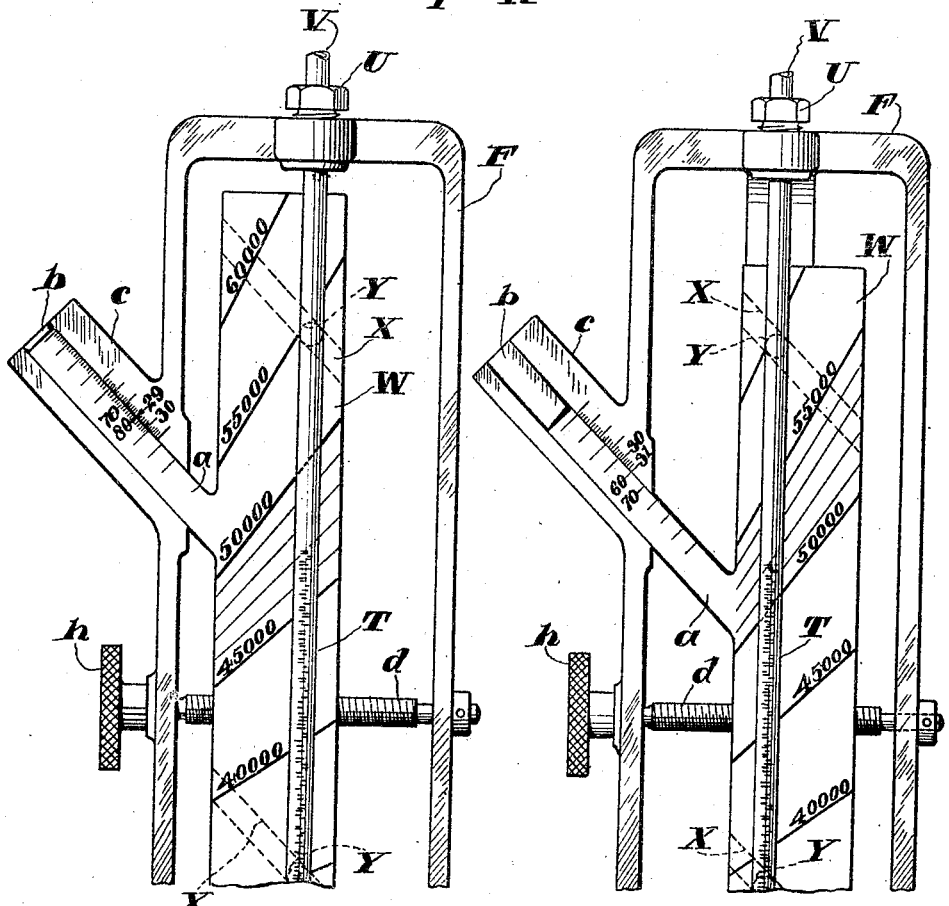
INVENTOR
Leslie R. Huff
BY
Herbert G. Ogden
HIS ATTORNEY Patented May 18, 1926.

1,584,859

UNITED STATES PATENT OFFICE.

LESLIE R. HUFF, OF PHILLIPSBURG, NEW JERSEY, ASSIGNOR TO INGERSOLL-RAND COMPANY, OF JERSEY CITY, NEW JERSEY, A CORPORATION OF NEW JERSEY.

VOLUME-REGULATOR GAUGE.

Application filed June 26, 1923. Serial No. 647,831.

This invention relates to a volume regulator gauge for a turbo compressor, turbo blower or the like, by means of which the correct height of a liquid column produced by the suction of a Venturi meter or other means, is indicated for a constant weight of oxygen drawn into the machine, at different atmospheric temperatures and barometric pressures.

It is desirable to regulate the volume of air drawn into a turbo blower, turbo compressor, or the like for a given temperature and barometric pressure, whereby the proper weight of oxygen delivered to a blast furnace, or wherever required, can be maintained constant, so that the burden on the furnace to suit atmospheric conditions, can be eliminated.

The barometric pressure rises and falls daily, and the temperature varies over wide limits as between summer and winter, day or night, or even from hour to hour. When the turbo blower is set for delivering a certain weight of oxygen per minute to the blast furnace, it is not unusual to find that the actual weight delivered has varied considerably from that which would be delivered under "standard" conditions of air. The blast furnace requires a constant weight of oxygen for combustion purposes, and if the weight of oxygen varies with each variation of barometric pressure or temperature the efficient operation of the furnace is disturbed.

Whenever atmospheric conditions indicate that the weight of oxygen delivered to the furnace is insufficient to permit proper combustion, it becomes necessary to speed up the machine, thereby augmenting the air volume drawn into the machine. The correct volume of air drawn for delivering a given weight of oxygen has been calculated from the temperature and barometric pressure by means of charts, which necessitate considerable time and trouble, and a change in atmospheric conditions might start the furnace working badly before the burden has changed, or the volume of air corrected.

One of the objects of the invention is to enable the correct volume of air drawn into the machine to be readily and conveniently determined without the aid of charts for a given temperature and barometric pressure, so that the delivery of a given weight of oxygen may be maintained.

Another object of the invention is to produce a gauge, which may be conveniently adjusted for different weather conditions, so that the proper volume of air to be drawn into a machine may be determined for delivering a given volume of oxygen.

To these and other ends, which will hereinafter appear, the invention consists of the features of construction and combinations of elements, substantially as hereinafter fully described and claimed in this specification and shown in the accompanying drawings, in which—

Figure 1 is a side elevation partly in vertical section of a volume regulator gauge connected to the intake of a turbo compressor.

Figure 2 is a vertical section taken on the line 2—2 of Figure 1 looking in the direction of the arrows, Figure 3 is a fragmentary detail view in horizontal section, taken on the line 3—3 of Figure 2, and Figures 4 and 5 are side elevations of a gauge with the lower part broken away, showing different positions of adjustment.

Referring to the drawings, a turbo compressor A is shown mounted in the usual manner on the foundation B, the floor line C being indicated for purposes of illustration. The intake conduit D of the compressor is preferably provided with a restricted portion in the form of a Venturi tube E, in which the velocity of the incoming fluid, such as air, is increased, producing sub-atmospheric pressure, as a Venturi tube has been found to be a convenient device for use in connection with a regulator gauge of the form described.

An up-right support or frame F, having a base G is shown mounted on the floor line C, and a glass cylinder or reservoir H, having a cover J is preferably mounted on the base G. A tap bolt K is threaded into the base G of the up-right frame, as at L, and holds the cylinder in place. A tube O connects the tap bolt K with the large diameter of the intake D, so that air from the intake may pass into and out of the cylinder H through the tube O, and through the passage P and port Q in the tap bolt K. The cylinder H communicates by means of the ports R and passage S in the base G with an up-right glass tube T, which is supported in the frame F by means of upper and lower gland nuts U. The tube T communicates with the throat or restricted portion of the Venturi tube E by means of the tube V.

An indicating member, preferably in the form of an adjustable plate W, is formed with diagonal grooves X, in which the pins Y enter for guiding the movement of the plate. The pins Y are in this instance threaded into the support F and held from turning by the lock nuts Z. The plate W is calibrated in fluid volumes of cubic feet per minute under standard conditions of air, as indicated by the large numbers, and indicating means such as a liquid, as red mineral oil, or mercury, is drawn up into the tube T from the reservoir H by a variation in the difference in pressure between the two points in the intake D of the compressor, to which the tubes O and V are connected. The liquid then indicates on the plate W, the volume of fluid supplied to the compressor.

In order to adjust the gauge for changes in barometric conditions, the plate W is formed with an arm $a$ which is calibrated in degrees of temperature, and is adapted to slide in a groove $b$ formed in a projection $c$ of the frame F. Although the projection $c$ is shown integral with the frame F and the arm $a$ is shown integral with the plate W, it is to be understood that these parts may be separate and mounted in any suitable manner. The projection $c$ is in this instance calibrated in barometric inches, and by moving the arm in and out of the groove $b$, the plate W may be adjusted for changes in weather conditions. Assuming for example, that the barometric reading is 30", and the thermometer reading is 70 degrees F., the arm $a$ should be moved to assume the position shown in Figure 1, with the point 70 opposite the point 30. The height of the liquid column would then be observed to indicate the volume of air flowing, and the speed of the machine increased or reduced to bring the volume scale reading at the proper figure desired.

Any suitable means may be provided for actuating the plate W, but in this instance, I have shown a screw $d$ having a bearing at each end of the frame F, and threaded into the block $e$. Guides $f$ secured to the plate W by means of the bolts $g$, guide the movement of the screw block $e$ when the knurled head $h$, which is connected to the screw $d$, is rotated, so that the plate W and arm $a$ are adjusted diagonally, and are guided by the pins Y moving in the grooves X in the frame F. By this means, the gauge may be adjusted for different atmospheric conditions.

The arm $a$ may be arranged at any desired angle with respect to the tube T and the inclinations of the calibrations on the plate W depend upon this angle. These calibrations are actually portions of curves plotted with pressures as ordinates and temperatures as abscissae. The zero line will then be parallel to the arm $a$ and the other axis will be parallel to the tube T. The curves corresponding to the various volumes are plotted accordingly; that is to say, the coordinates are inclined to each other at the angle between the arm $a$ with the tube T, instead of with rectangular coordinates.

I claim:

1. A volume regulator gauge for constant volume governing of turbo blowers and compressors, comprising a frame, an adjustable indicating member carried by the frame calibrated in fluid volumes under standard conditions, an arm associated with said indicating member having a scale calibrated in degrees of temperature, a stationary part adjacent said arm calibrated in barometric inches, indicating means subject to intake conditions of the turbo machine and adapted to cooperate with the fluid volume calibrations on said indicating member, and means for adjusting said indicating member so as to move said temperature scale relative to said stationary barometric scale in accordance with changes in barometric conditions, whereby the volume of fluid supplied to the turbo machine may be indicated for atmospheric conditions other than standard.

2. A volume regulator gauge for constant volume governing of turbo blowers and compressors, comprising an upright frame, a plate adjustably mounted on the frame calibrated in fluid volumes under standard conditions, said plate having an arm calibrated in degrees of temperature, said frame being provided with a scale calibrated in barometric inches, indicating means subject to intake conditions of the turbo machine associated with the intake of the turbo machine and adapted to cooperate with the fluid volume scale on said plate, and manual means for adjusting said plate relative to said barometric scale on the frame for changes in barometric conditions, whereby the volume of fluid supplied to the turbo machine may be indicated for atmospheric conditions other than standard.

3. A volume regulator gauge for constant volume governing of turbo blowers and compressors, comprising an upright frame, a plate adjustably mounted on the frame calibrated in fluid volumes under standard conditions, said plate having an arm calibrated in degrees of temperature, said frame being provided with a scale calibrated in barometric inches, indicating means actuated by the fluid volume intake of the turbo machine, and a screw for adjusting said plate relative to said barometric scale on the frame for changes in barometric conditions, whereby the volume of fluid supplied to the turbo machine may be indicated for these conditions in terms of standard conditions.

4. A volume regulator gauge for constant volume governing of turbo blowers and compressors, comprising an upright frame, a plate adjustably mounted on the frame calibrated in fluid volumes under standard conditions, said plate having an arm calibrated in degrees of temperature, said frame being provided with a scale calibrated in barometric inches, a tube mounted in the frame, a liquid in said tube, and adapted to rise and fall in accordance with the fluid volume intake of the machine, and means for adjusting said plate relative to said barometric scale on the frame for changes in barometric and temperature conditions, whereby the volume of fluid supplied to the turbo machine may be indicated in terms of standard conditions determined.

5. A volume regulator gauge for constant volume governing of turbo blowers and compressors, comprising an upright frame, a plate having diagonal grooves, guide pins mounted in the frame extending into said grooves, said plate being calibrated in terms of fluid volumes under standard conditions, and having an arm calibrated in degrees of temperature, said frame being provided with a scale calibrated in barometric inches, a tube mounted in said frame, liquid in said tube adapted to rise and fall in accordance with the fluid volume supplied to the machine, and means for adjusting said plate relative to said barometric scale on the frame for changes in barometric conditions, whereby the volume of fluid supplied to the turbo machine may be indicated directly in terms of standard conditions.

In testimony whereof I have signed this specification.

LESLIE R. HUFF.